H. B. LESTER.
VEHICLE BRAKE.
APPLICATION FILED AUG. 2, 1910.
989,617.
Patented Apr. 18, 1911.
2 SHEETS—SHEET 1.
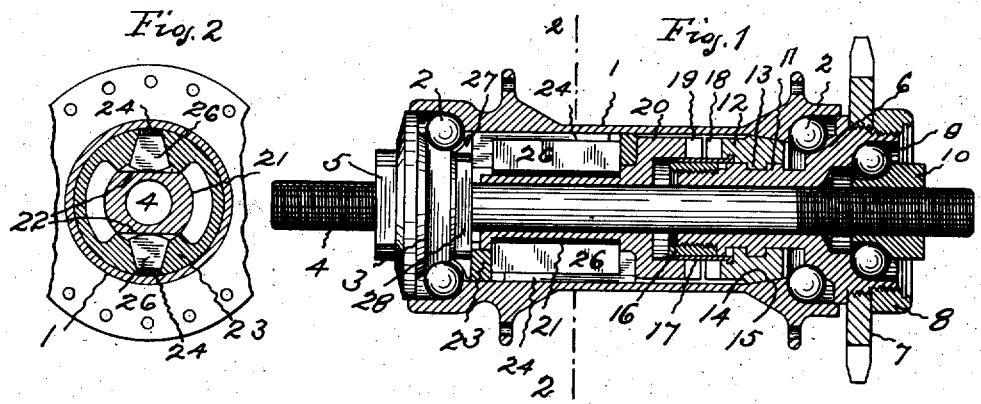
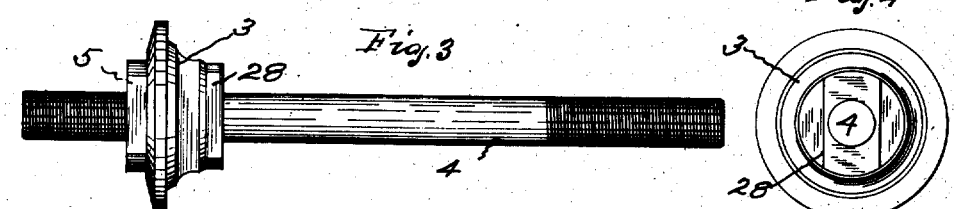
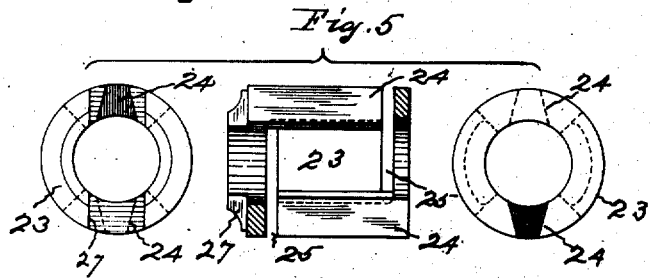
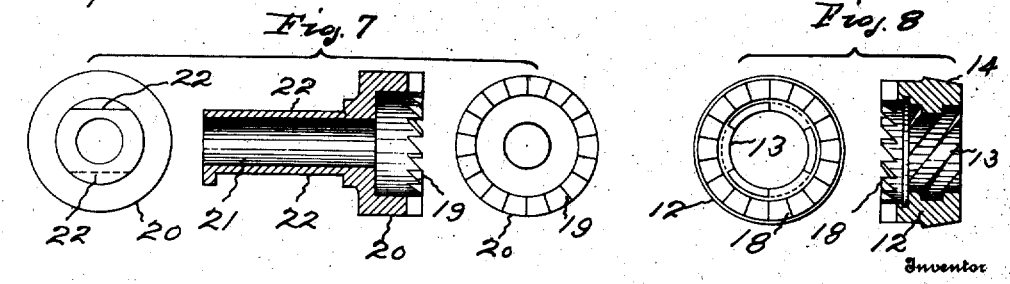
Witnesses
Josephine M. Strempfer
Harry A. Stevens
Inventor
Harry B. Lester, by
Harry P. Williams
Attorney

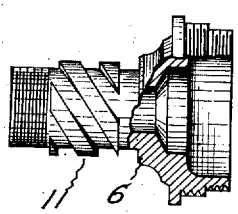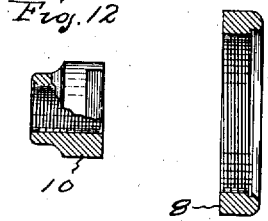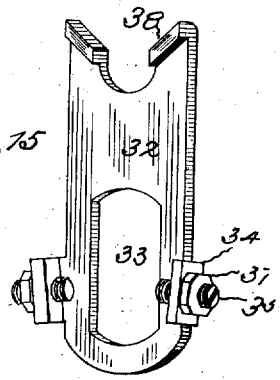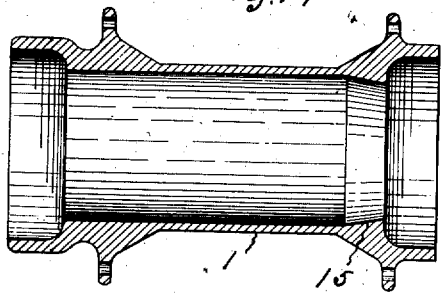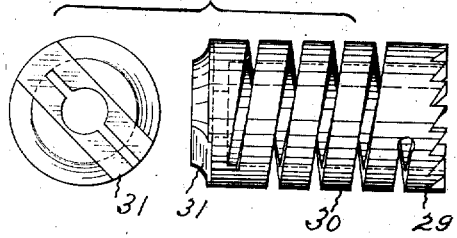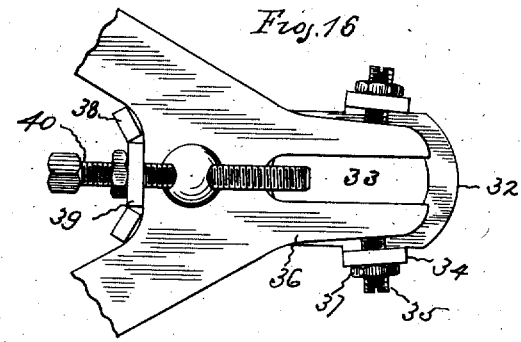

UNITED STATES PATENT OFFICE.

HARRY B. LESTER, OF DAYTON, OHIO, ASSIGNOR TO THE DAVIS SEWING MACHINE COMPANY, OF DAYTON, OHIO, A CORPORATION OF OHIO.

VEHICLE-BRAKE.

989,617.  Specification of Letters Patent.  Patented Apr. 18, 1911.

Application filed August 2, 1910. Serial No. 575,152.

*To all whom it may concern:*

Be it known that I, HARRY BURDETT LESTER, a citizen of the United States, residing at Dayton, in the county of Montgomery and State of Ohio, have invented a new and useful Improvement in Vehicle-Brakes, of which the following is a specification.

This invention relates to those brakes for bicycles, motor cycles and other vehicles which are so constructed that while the driven member will run free when the brake parts are in their normal positions, a forward pull on the driving member causes a rotatory driving clutch part connected therewith to automatically engage the driven member and drive it forward, and a backward draft on the driving member causes the driving clutch part to be disengaged from the driven member and connected with a relatively fixed clutch part in such manner as to cause that part to become engaged with the driven member and retard or stop its rotation.

The object of the invention is to produce a brake of this character which, while small in diameter and adaptable to vehicles of various types, and having balls of large size running in races that are of considerable diameter and are widely separated in order to provide a strong, firm and durable bearing, has a very quick acting, powerful and durable braking clutch which is so actuated that no strain or pressure is brought upon the bearings when it is set for braking.

This invention is illustrated herein as embodied in a brake for bicycles. The brake shown has a driving clutch part in the form of a tapering sleeve which is threaded upon and has a limited longitudinal movement along a part of the driving member which in this case is the sprocket hub. When the sprocket hub is turned in one direction, the tapering end of the sleeve is engaged with a tapering inner wall of the driven part or wheel hub, and when the sprocket hub is turned in the opposite direction, the driving clutch sleeve is moved longitudinally and disengaged from the wheel hub and connected with a collar which under the continued rotary movement of the clutch sleeve in the reverse direction causes a fixed cylindrical clutch or drum to be expanded into engagement with a cylindrical inner wall of the wheel hub for braking purposes.

Figure 1 of the accompanying drawings shows a central longitudinal section of the hub and brake parts. Fig. 2 is a transverse section on the plane indicated by the dotted line 2—2 on Fig. 1. Fig. 3 is a side view of the fixed axle and one of the stationary ball cones. Fig. 4 is an end view of the axle and cone. Fig. 5 shows a central section and the two ends of a preferred form of brake clutch drum. Fig. 6 shows a side and an end view of one of the wedges employed to expand the brake clutch drum shown in Fig. 5. Fig. 7 shows a central section and the two ends of the collar that is engaged by the driving clutch sleeve on its inward movement, and the cam shaft attached to said collar which is used to force the expanding wedges into the brake drum. Fig. 8 shows a face and a section of the interiorly threaded driving clutch sleeve. Fig. 9 is a section of the drag bushing. Fig. 10 is a section of the stop nut which is employed to limit the longitudinal movement of the driving clutch sleeve. Fig. 11 shows a view of the exteriorly threaded sprocket hub or driving member. Fig. 12 shows a view of one of the axle ball cones. Fig. 13 is a section of the driving sprocket lock nut. Fig. 14 shows a longitudinal section of the wheel hub or driven member. Fig. 15 shows a perspective view of an adjustable cone retainer. Fig. 16 shows a side view of the end of a frame provided with one of these cone retainers. Fig. 17 shows an end and side view of a modified form of brake clutch.

The wheel hub 1 may have any desired outline. In each end of the wheel hub is a race containing balls 2 of considerable size. The balls at one end are held in the race by a cone 3 which is screwed upon the threaded end of the axle 4 and is held against rotation after it has been adjusted, by the engagement of the common flattened hub 5 with the walls of the opening in the frame, or by any other desired means. The balls at the other end of the wheel hub are held in the race by the cone on the sprocket hub 6, which turns freely on the axle. Screwed, or otherwise secured upon the outer end of the sprocket hub is the driving sprocket 7, which in the organization shown is held in place by the annular sprocket lock nut 8. In the outer end of the sprocket hub is a race containing balls 9 which are held in place by the cone 10, that when set is held against rotation by the engagement of its flattened outer end with the frame or other device.

The driving member or sprocket hub on its exterior has coarse threads 11. The driving clutch sleeve 12 has corresponding coarse threads 13 in its interior, which fit the threads on the exterior of the sprocket hub. At one end the exterior of this clutch sleeve has a conical surface 14 which is adapted to engage the tapering inner wall 15 of the wheel hub. The threads are so pitched that when the sprocket hub is turned forward, the clutch sleeve is caused to engage with the wheel hub and drive it forward with the driving member. When the sprocket hub is turned backward, the threads move the driving clutch sleeve longitudinally and cause it to disengage from the wheel hub. Screwed on the threaded inner end of the sprocket hub is a stop nut 16 which is designed to limit the inward movement of the driving clutch sleeve, and connected with the clutch sleeve is a drag bushing 17. This bushing is slitted so that it frictionally binds against the parts with which it is engaged, in order to insure the proper action of the clutch sleeve.

The inner end of the driving clutch sleeve has ratchet teeth 18. Adjacent and opposite to these are ratchet teeth 19 on the collar 20. Extending from this collar is a tubular shaft 21 which has portions of its sides 22 flattened to provide camming surfaces. Surrounding this cam shaft is the cylindrical brake drum 23 which has mortises 24 extending longitudinally for a part of its length on opposite sides, and transverse grooves 25 for the purpose of rendering the drum expansible. In the longitudinal mortises of the brake drum are wedges 26. These rest against the flattened or cam surfaces of the cam shaft which is connected with the ratchet-toothed collar. When the sprocket hub is turned backward, the driving clutch sleeve is moved inward. After it has moved inward a sufficient distance, its teeth engage the teeth of the collar and turn it so as to partially rotate the cam shaft connected therewith, the cam surfaces of which, when turned, force out the diametrically opposite wedges and cause them to expand the brake drum against the cylindrical inner wall of the wheel hub for braking purposes. The inward movement of the clutch sleeve, as above stated, is limited by the stop nut on the end of the sprocket hub. Consequently, there is no longitudinal thrust between the clutch sleeve and the cam shaft collar, the only pressure being that rotary pressure which is incident to the engagement of the flat surfaces of the teeth of these two parts. The end of the brake drum has a mortise 27 which fits the flattened extension 28 on the inner side of the stationary cone 3, for preventing the rotation of the brake drum.

The brake drum may be slitted spirally as shown in Fig. 17. In this case, the toothed collar 29, which is engaged by the toothed driving clutch sleeve may be connected directly with the spiral body 30. This spiral body has a transverse mortise 31, at one end which is adapted to engage the flattened part 28 of the cone 3, for holding the clutch drum against rotation. In this form, when the driving clutch sleeve has been moved longitudinally inward by the reverse rotation of the sprocket hub, and its teeth engage the teeth of the collar, the untwisting of the spiral causes the drum to expand against the cylindrical inner wall of the wheel hub.

For the purpose of preventing the rotation of the stationary ball cones on the spindles, I have provided an adjustable cone retainer which is adapted to be connected with various forks. One of these retainers is shown in Fig. 15. In the body 32 of this retainer is an opening 33 which is adapted to receive the flattened outer end of the cone. Lugs 34 are turned up from the edges of the plate, and extending through threaded openings in these lugs are screws 35 which are adapted to be set against the ends of the fork 36, and to be fastened against movement by the clamp nuts 37. The retainer plate has at the opposite end lugs 38 which are designed to engage the edges of the fork end each side of the lug 39 which carries the axle adjusting screw 40.

The invention claimed is:

1. The combination of a driven member, a threaded driving member, a threaded clutch sleeve fitting and longitudinally movable along the driving member, said clutch member having ratchet teeth in one end, a non-rotating brake drum located within the driven member, and rotatory means for expanding said brake drum against the inner surface of the driven member, said expanding means having ratchet teeth in one end, the threaded connection between the driving member and the clutch sleeve being such that, when the driving member is turned forwardly the clutch sleeve is moved longitudinally outward and caused to engage with the inner wall of the driven member for the purpose of driving it forward, and when the driving member is turned backwardly the clutch sleeve is moved longitudinally inward so its teeth will engage with the teeth of the brake drum expanding means, and by positive rotatory pressure against said expanding means cause the expansion of the drum against the inner wall of the driven member for braking the same.

2. The combination of a driven member, a threaded driving member, a threaded clutch sleeve fitting and movable longitudinally along the driving member, means mounted on the threaded driving member for limiting the inward longitudinal movement of the clutch sleeve a non-rotating brake drum located within the driven member, and rotatory means for expanding said brake drum against the inner surface of the driven member, the threaded connection between the driving member and the clutch sleeve being such that, when the driving member is turned forwardly the clutch sleeve is moved longitudinally outward and caused to engage with the inner wall of the driven member for the purpose of driving it forward, and when the driving member is turned backwardly the clutch sleeve is moved longitudinally inward a limited distance so it will positively engage with the brake drum expanding means and by positive rotatory pressure against said expanding means, cause the expansion of the drum against the inner wall of the driven means for braking the same.

3. The combination of a wheel hub, a threaded sprocket hub, a threaded clutch sleeve fitting and longitudinally movable along the sprocket hub, said sleeve having ratchet teeth in one end, a non-rotating brake drum located within the wheel hub, and rotatory means for expanding said brake drum against the inner surface of the wheel hub, said expanding means having ratchet teeth in one end, the threaded connection between the sprocket hub and the clutch sleeve being such that, when the sprocket hub is turned forwardly the clutch sleeve is moved longitudinally outward and caused to engage with the inner wall of the wheel hub for the purpose of driving it forward, and when the sprocket hub is turned backwardly the clutch sleeve is moved longitudinally inward so its teeth will engage with the teeth of the brake drum expanding means, and by positive rotatory pressure against said expanding means cause the expansion of the drum against the inner wall of the wheel hub for braking the same.

4. The combination of a driven member, a threaded driving member, a threaded sleeve fitted upon and movable longitudinally along the driving member, said sleeve having ratchet teeth in one end, a fixed expansible brake drum located in the driven member, outwardly moving wedges for expanding the brake drum, a rotatable cam shaft for forcing the wedges outwardly, and a rotatable collar connected with said cam shaft, said collar having ratchet teeth in one face, the threaded connection between the driving member and the threaded sleeve being such that, when the driving member is turned forwardly the sleeve is moved longitudinally outward into engagement with the inner wall of the driven member, and when the driving member is moved backwardly the sleeve is moved longitudinally inward so that its teeth will positively engage with the teeth on the collar connected with the cam shaft.

5. The combination of a wheel hub having ball races in its ends, balls located in said races, cones holding said balls in the races, a stationary axle extending through said cones, an expansible brake drum located within the wheel hub and held against rotation by one of the ball cones, wedges located in opposite sides of said drum for expanding the same, a cam shaft for forcing the wedges outwardly and expanding the drum, a toothed collar attached to said cam shaft, a sprocket wheel, a hub attached to said sprocket wheel, said hub having a thread on its exterior, and a sleeve with an interior thread fitting the threaded hub, said sleeve having one end adapted to engage the inner wall of the wheel hub, and the other end toothed for engagement with the toothed collar attached to the cam shaft, said threads being so arranged that forward movement of the sprocket hub moves the sleeve longitudinally into engagement with the wheel hub, and the backward movement of the sprocket hub causes the sleeve to move longitudinally inward for the purpose of engaging its teeth with the teeth of the cam shaft collar.

HARRY B. LESTER.

Witnesses:
JAS. DANGERFIELD,
WILLIAM GRAY.